US012624470B2

(12) United States Patent
Beh et al.

(10) Patent No.: US 12,624,470 B2
(45) Date of Patent: May 12, 2026

(54) SYSTEM AND METHOD FOR SEPARATING A REACTION PRODUCT FROM A FLUID

(71) Applicant: Genesee Valley Innocations, LLC, Santa Clara, CA (US)

(72) Inventors: Eugene S. Beh, Portola Valley, CA (US); Francisco E. Torres, San Jose, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 1217 days.

(21) Appl. No.: 17/522,079

(22) Filed: Nov. 9, 2021

(65) Prior Publication Data

US 2023/0141446 A1     May 11, 2023

(51) Int. Cl.
*C25B 13/00* (2006.01)
*B01D 61/00* (2006.01)
(Continued)

(52) U.S. Cl.
CPC .......... *C25B 15/087* (2021.01); *B01D 61/002* (2013.01); *B01D 61/427* (2013.01);
(Continued)

(58) Field of Classification Search
CPC ...... B01D 61/50; B01D 61/42; B01D 61/422; B01D 61/463; B01D 61/56; B01D 61/002;
(Continued)

(56) References Cited

U.S. PATENT DOCUMENTS

| | | | |
|---|---|---|---|
| 2,672,024 A | 3/1954 | Mcgrath | |
| 4,118,299 A | 10/1978 | Maget | |

(Continued)

FOREIGN PATENT DOCUMENTS

| | | |
|---|---|---|
| CN | 206055832 | 3/2017 |
| CN | 108187459 | 6/2018 |

(Continued)

OTHER PUBLICATIONS

Petrova et al., "Perfluorinated hybrid membranes modified by metal decorated clay nanotubes", Journal of Membrane Science, vol. 582, Jul. 15, 2019, pp. 172-181.

(Continued)

*Primary Examiner* — Luan V Van
(74) *Attorney, Agent, or Firm* — Mueting Raasch Group

(57) ABSTRACT

An electrochemical system includes a first reservoir comprising a first fluid and a catalyst, wherein the first fluid comprises a reaction mixture that reacts to form first and second products, and a second reservoir comprises a second fluid. A first electrode contacts a redox-active electrolyte material solution and has a reversible redox reaction with the electrolyte material to accept at least one ion. A second electrode contacts a redox-active electrolyte material solution and has a reversible redox reaction with the electrolyte material to drive at least one ion into the second fluid as an electrical potential is supplied. A diluted effluent comprising the second product and the catalyst exits the second reservoir, wherein the second product is removed from the first reservoir via electroosmosis, and optionally concurrently via osmosis, and a product stream comprising the first product exits the first reservoir.

22 Claims, 4 Drawing Sheets

(51) Int. Cl.

| | | |
|---|---|---|
| *B01D 61/42* | (2006.01) | |
| *B01D 61/56* | (2006.01) | |
| *C25B 9/19* | (2021.01) | |
| *C25B 15/08* | (2006.01) | |

(52) U.S. Cl.
CPC ................ *B01D 61/56* (2013.01); *C25B 9/19* (2021.01); *C25B 13/00* (2013.01)

(58) Field of Classification Search
CPC .. B01D 61/58; B01D 61/48; B01D 2311/263; B01D 61/427; C02F 2201/46115; C02F 1/445; C02F 1/4693; C02F 1/4698; C02F 2001/46138; C02F 2201/4618; C25B 9/19; C25B 15/087; C25B 13/00
See application file for complete search history.

(56) References Cited

U.S. PATENT DOCUMENTS

| | | | |
|---|---|---|---|
| 4,593,534 | A | 6/1986 | Bloomfield |
| 4,984,434 | A | 1/1991 | Peterson et al. |
| 6,159,352 | A | 12/2000 | Riera et al. |
| 6,187,201 | B1 | 2/2001 | Abe et al. |
| 6,719,891 | B2 | 4/2004 | Ruhr et al. |
| 7,083,730 | B2 | 8/2006 | Davis |
| 7,974,076 | B2 | 7/2011 | Xiong et al. |
| 7,992,855 | B2 | 8/2011 | Awano |
| 8,142,633 | B2 | 3/2012 | Batchelder et al. |
| 8,545,692 | B2 | 10/2013 | James et al. |
| 8,769,972 | B2 | 7/2014 | Bahar |
| 8,801,910 | B2 | 8/2014 | Bazant et al. |
| 8,999,132 | B2 | 4/2015 | Bazant et al. |
| 9,112,217 | B2 | 8/2015 | Kim et al. |
| 9,340,436 | B2 | 5/2016 | Sahu et al. |
| 9,546,426 | B2 | 1/2017 | Logan et al. |
| 9,548,620 | B2 | 1/2017 | Hu et al. |
| 9,640,826 | B2 | 5/2017 | Yan et al. |
| 9,670,077 | B2 | 6/2017 | Volkel et al. |
| 9,673,472 | B2 | 6/2017 | Volkel et al. |
| 9,905,876 | B2 | 2/2018 | Schubert et al. |
| 10,124,296 | B2 | 11/2018 | Pozzo et al. |
| 10,374,239 | B2 | 8/2019 | Zhang et al. |
| 10,525,417 | B2 | 1/2020 | Newbloom et al. |
| 10,550,014 | B2 | 2/2020 | Desai et al. |
| 10,821,395 | B2 | 11/2020 | Beh et al. |
| 10,822,254 | B2 | 11/2020 | Desai et al. |
| 11,015,875 | B2 | 5/2021 | Benedict et al. |
| 11,020,713 | B2 | 6/2021 | Demeter et al. |
| 11,117,090 | B2 | 9/2021 | Benedict et al. |
| 11,149,970 | B2 | 10/2021 | Bahar et al. |
| 2005/0183956 | A1 | 8/2005 | Katefidis |
| 2006/0141346 | A1 | 6/2006 | Gordon et al. |
| 2015/0048777 | A1 | 2/2015 | Goldstein |
| 2015/0232348 | A1 | 8/2015 | Jepson |
| 2019/0240614 | A1 | 8/2019 | Beh et al. |
| 2019/0240623 | A1 | 8/2019 | Beh et al. |
| 2020/0070094 | A1 | 3/2020 | Hussaini et al. |
| 2020/0164312 | A1 | 5/2020 | Beh et al. |
| 2021/0370228 | A1 | 12/2021 | Benedict et al. |

FOREIGN PATENT DOCUMENTS

| | | |
|---|---|---|
| EP | 3336064 | 6/2018 |
| JP | 04-18919 | 4/1992 |
| KR | 20130106530 | 9/2013 |
| KR | 20150034545 | 4/2015 |
| WO | 2014/181898 | 11/2014 |
| WO | 20150143332 | 9/2015 |
| WO | 2018/032003 | 2/2018 |
| WO | 2018/119280 | 6/2018 |
| WO | 20180191806 | 10/2018 |

OTHER PUBLICATIONS

Pismenskaya et al., "Can the electrochemical performance of heterogeneous ion-exchange membranes be better than that of homogeneous membranes?", Journal of Membrane Science, vol. 566, Nov. 15, 2018, pp. 54-68.

Shah et al., "Comparative Studies on Performance of Interpolymer and Heterogeneous Ion-Exchange Membranes for Water Desalination by Electrodialysis", Desalination 172, 2005, pp. 257-265.

European Patent Application No. 22202901.9; Office Action issued Mar. 13, 2023.

Castro-Munoz et al., "Pervaporation-Assisted Esterification Reactions by Means of Mixed Matrix Membranes," 2018, Ind. Eng. Chem. Res. 57: 15998-16011.

Epsztein et al., "Activation behavior for ion permeation in ion-exchange membranes: Role of ion dehydration in selective transport", Journal of Membrane Science 580, 2019, pp. 316-326.

Kaibara et al., Study of Ion Transport across Amphoteric Ion Exchange Membrane. II. Transport of Symmetric Tetraalkylammonium Chlorides?,, Bull. Chem. Sco. Jpn, 56, 1983, pp. 1346-1350.

Scialdone et al., "Investigation of electrode material—Redox couple systems for reverse electrodialysis processes. Part I: Iron redox couples", Journal of Electroanalytical Chemistry 2012, 681 (Supplement C), 66-75.

Seto et al., "Seawater desalination by electrodialysis", Desalination 1978, 25 (1), 1-7.

Solveichik, "Flow batteries: current status and trends", Chem. Rev. 2015, 115 (20), 11533-58. (no copy available).

Stillwell et al., "Predicting the specific energy consumption of reverse osmosis desalination", Water 2016, 8 (12).

Torres et al., U.S. Appl. No. 63/127,604, filed Dec. 18, 2020.

Urban, "Emerging Scientific and Engineering Opportunities within the Water-Energy Nexus", Joule, Dec. 20, 2017, pp. 665-688.

US Dept. of Energy, "Desiccant Enhanced Evaporative Air-Conditioning (DEVap): Evaluation of a New Concept in Ultra Efficient Air Conditioning", Technical Report NREL/TP-5500-49722, 2011.

US Dept. of Energy, "Energy Savings Potential and RD&D Opportunities for Commercial Building HVAC Systems", Dec. 2017, 172 pages.

US Dept. of Interior/US Geological Survey, Estimated Use of Water in the United States in 2010, 2014, 64 pages.

Vermaas et al., "High Efficiency in Energy Generation from Salinity Gradients with Reverse Electrodialysis", ACS Sustainable Chem. Eng. 1, 2013, pp. 1295-1302.

Viswanathan et al., "Cost and performance model for redox flow batteries", Journal of Power Sources, vol. 247, Dec. 23, 2012, pp. 1040-1051.

Wang et al., "Continuous desalination with a metal-free redox-mediator", Journal of Materials Chemistry A, No. 7, 2019, 7 pages.

Woods, "Membrane processes for heating, ventilation, and air conditioning", Renewable and Sustainable Energy Reviews, vol. 33, 2014, pp. 290-304.

Wu et al., "Kinetic study on regeneration of Fe(II)EDTA in the wet process of NO removal", Chemical Engineering Journal 2008, 140 (1), 130-135.

Ye et al., "Performance of a mixing entropy battery alternately flushed with wastewater effluent and seawater for recovery of salinity gradient energy", Energy Environ. Sci. 2014, 7 (7), 2295-2300.

Zhang et al., "A Natural Driven Membrane Process for Brackish and Wastewater Treatment: Photovoltaic Powered ED and FO Hybrid System", Environmental Science and Technology, Sep. 4, 2013, pp. 10548-10555.

"Lazard's Levelized Cost of Storage—Version 2.0." 2016, 46 pages.

Al-Jubainawi et al., "Factors governing mass transfer during membrane electrodialysis regeneration of LiCl solution for liquid desiccant dehumidification systems", Sustainable Cities and Society, vol. 28, Aug. 26, 2016.

Al-Karaghouli et al., "Energy consumption and water production cost of conventional and renewable-energy-powered desalination processes", Renewable and Sustainable Energy Reviews 2013, 24, 343-356.

(56) References Cited

OTHER PUBLICATIONS

Anderson et al., Capacitive deionization as an electrochemical means of saving energy and delivering clean water. Comparison to present desalination practices: Will it compete?: , Electrochimica Acta 2010, 55 (12), 3845-3856.

Arellano et al., "Effects of pH on the degradation of aqueous ferricyanide by photolysis and photocatalysis under solar radiation", Solar Energy Materials and Solar Cells 2010, 94 (2), 327-332.

ASHRAE Standard, "Method of Testing for Rating Desiccant Dehumidifiers Utilizing Heat for the Regeneration Process", 2007.

Bajpayee et al., "Very low temperature membrane-free desalination by directional solvent extraction", Energy Environ. Sci. 2011, 4 (5), 1672.

Beh et al., "A Neutral pH Aqueous Organic-Organometallic Redox Flow Battery with Extremely High Capacity Retention" ACS Energy Lett, 2017, 2, pp. 639-644.

Beh et al., U.S. Appl. No. 17/149,184, filed Jan. 14, 2021.

Beh et al., U.S. Appl. No. 17/214,404, filed Mar. 26, 2021.

Beh, U.S. Appl. No. 17/357,155, filed Jun. 24, 2021.

Benedict et al., U.S. Appl. No. 17/161,904, filed Jan. 29, 2021.

Benedict et al., U.S. Appl. No. 17/204,703, filed Mar. 17, 2021.

Benedict et al., U.S. Appl. No. 17/400,774, filed Aug. 12, 2021.

BTMAP-VI et al., "Ordering and Customer Service Neutral pH Aqueous Redox Flow Battery Materials", Jan. 1, 2017, pp. 639.

Cheng et al., "Double-Stage Photovoltaic/Thermal ED Regeneration for Liquid Desiccant Cooling System", Energy and Buildings, 51, 2012, pp. 64-72.

Dai, "Increasing drought under global warming in observations and models", Nat. Clim.Change 2013, 3 (1), 52-58.

Darling et al., "Pathways to low-cost electrochemical energy storage: a comparison of aqueous and nonaqueous flow batteries", Energy Environ. Sci. 2014, 7 (11), 3459-3477.

Desai et al., "Electrochemical Desalination of Seawater and Hypersaline Brines with Coupled Electricity Storage", ACS Energy Lett. 3, 2, 2018, pp. 375-379.

Desalination Experts Group, "Desalination in the GCC", 2014, 47 pages.

Dipaola, "Saudi Arabia Gets Cheapest Bids for Solar Power in Auction"Bloomberg, Jan. 16, 2018, 3 pages.

Ferguson et al., "Studies On Overvoltage. IX: The Nature of Cathode and Anode Discharge Potentials at Several Metal Surfaces1,2", J. Phys. Chem. 1937, 42 (2), 171-190. (no copy available).

Gong et al., "A zinc-iron redox-flow battery under $100 per kWh of system capital cost", Energy & Environmental Science, 2015. 5 pages.

Gong et al., All-Soluble All-Iron Aqueous Redox-Flow Battery, ACS Energy Letters, 2016, 1, pp. 89-93.

Gowin, "Examining the economics of seawater desalination using the DEEP code", Nuclear Power Technology Development Section, I. A. E. A., Ed. Vienna, Austria, 2000.

Gu et al., "A multiple ion-exchange membrane design for redox flow batteries", Energy Environ. Sci. 2014, 7 (9), 2986.

Hilbert et al., "Correlations between the Kinetics of Electrolytic Dissolution and Deposition of Iron: I . The Anodic Dissolution of Iron", Journal of The Electrochemical Society 1971, 118 (12), 1919-1926.

Howell et al., "Overview of the DOE VTO Advanced Battery R&D Program", Jun. 6, 2016 24 pages.

Hu et al, "Long-Cycling Aqueous Organic Redox Flow Battery (AORFB) toward Sustainable and Safe Energy Storage", Journal of the American Chemical Society 2017, 139 (3), 1207-1214.

John et al., "Seasonal cycles of temperature, salinity and water masses of the western Arabian gulf", Oceanol. Acta 1990, 13 (3), 273-281.

Khawaji et al., "Advances in seawater desalination technologies", Desalination 2008, 221 (1-3), 47-69.

Konopka et al., "Diffusion coefficients of ferri- and ferrocyanide ions in aqueous media, using twin-electrode thin-layer electrochemistry", Anal. Chem. 1970, 42 (14), 1741-1746. (no copy available).

Kozubal et al., "Low-Flow Liquid Desiccant Air-Conditioning: Demonstrated Performance and Cost Implications" NREL Technical Report, Sep. 2014, 104 pages.

La Mantia et al., "Batteries for efficient energy extraction from a water salinity difference", Nano Lett. 2011, 11 (4), 1810-3.

Lee et al., "Desalination of a thermal power plant wastewater by membrane capacitive deionization", Desalination 196, 2006, pp. 125-134.

Lee et al., "Rocking chair desalination battery based on Prussian blue electrodes", ACS Omega 2017, 2 (4), 1653-1659.

Li et al., "Photovoltaic-electrodialysis regeneration method for liquid desiccant cooling system", Solar Energy, vol. 83, 2009, pp. 2195-2204.

Logan et al., "Membrane-based processes for sustainable power generation using water", Nature 2012, 488, 313.

Loutatidou, et al., "Capital cost estimation of RO plants: GCC countries versus southern Europe", Desalination 2014, 347, 103-111.

Malhotra et al., "Use cases for stationary battery technologies: A review of the literature and existing projects", Renewable and Sustainable Energy Reviews 56, 2016, pp. 705-721.

Mcgovern et al., "On the cost of electrodialysis for the desalination of high salinity feeds", Applied Energy 136, Dec. 2014, pp. 649-661.

Moore et al., "Evaporation from Brine Solutions Under Controlled Laboratory Conditions; Report 77 for the Texas Water Development Board", May 1968, 77 pages.

Nair et al., "Water desalination and challenges: The Middle East perspective: a review", Desalin. Water Treat. 2013, 51 (10-12), 2030-2040.

Oren, "Capacitive deionization (CDI) for desalination and water treatment—past, present and future (a review)", Desalination 2008, 228 (1-3), 10-29.

Pasta et al., "A desalination battery" Nano Lett.2012, 12 (2), 839-43.

Patil et al., "Diffusivity of some zinc and cobalt salts in water", J. Chem. Eng. Data 1993, 38 (4), 574-576.

Sadrzadeh et al., "Sea water desalination using electrodialysis", Desalination 2008, 221 (1), 440-447.

Sata, "Application of Ion Exchange Membranes. In Ion Exchange Membranes: Preparation, Characterization, Modification and Application", The Royal Society of Chemistry: Cambridge, 2004.

Schaetzle et al., "Salinity Gradient Energy: Current State and New Trends", Engineering, vol. 1, Issue 2, Jun. 2016, pp. 164-166.

Scialdone et al., "Investigation of electrode material—redox couple systems for reverse electrodialysis processes—Part II: Experiments in a stack with 10-50 ce", Journal of Electroanalystical Chemistry, vol. 704, Jun. 14, 2013, pp. 1-9.

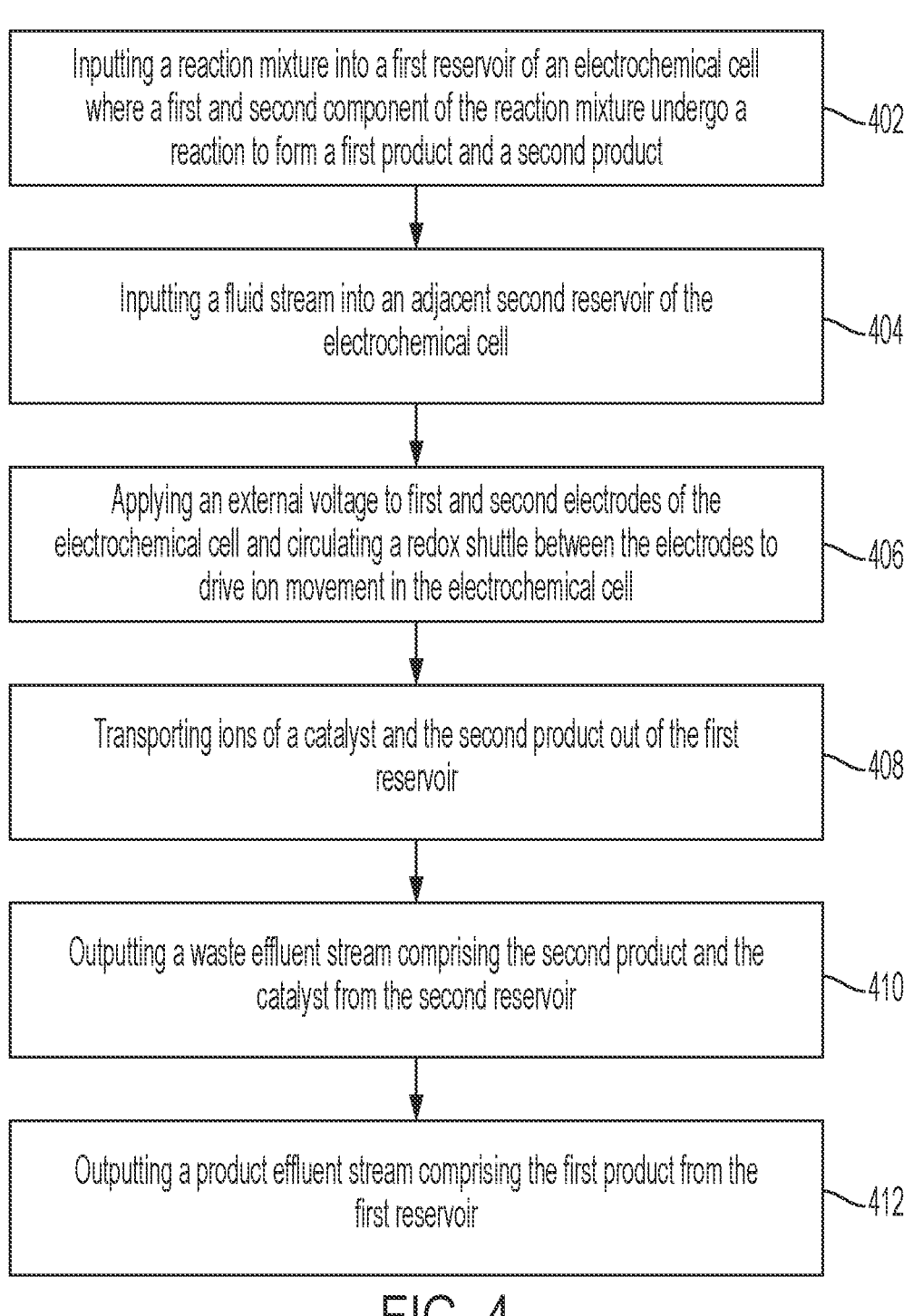

Inputting a reaction mixture into a first reservoir of an electrochemical cell where a first and second component of the reaction mixture undergo a reaction to form a first product and a second product —402

Inputting a fluid stream into an adjacent second reservoir of the electrochemical cell —404

Applying an external voltage to first and second electrodes of the electrochemical cell and circulating a redox shuttle between the electrodes to drive ion movement in the electrochemical cell —406

Transporting ions of a catalyst and the second product out of the first reservoir —408

Outputting a waste effluent stream comprising the second product and the catalyst from the second reservoir —410

Outputting a product effluent stream comprising the first product from the first reservoir —412

FIG. 4

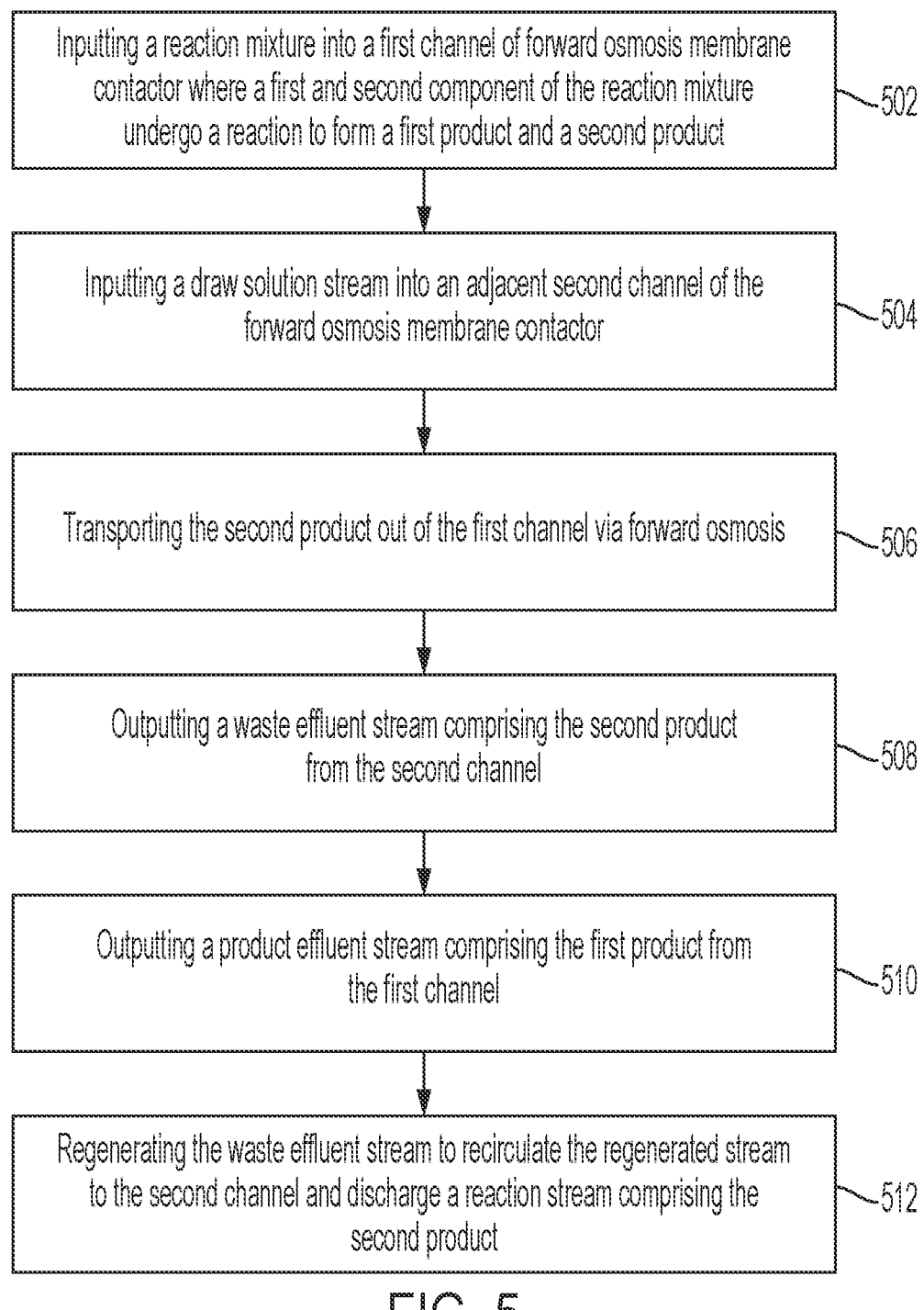

Inputting a reaction mixture into a first channel of forward osmosis membrane contactor where a first and second component of the reaction mixture undergo a reaction to form a first product and a second product ~502

Inputting a draw solution stream into an adjacent second channel of the forward osmosis membrane contactor ~504

Transporting the second product out of the first channel via forward osmosis ~506

Outputting a waste effluent stream comprising the second product from the second channel ~508

Outputting a product effluent stream comprising the first product from the first channel ~510

Regenerating the waste effluent stream to recirculate the regenerated stream to the second channel and discharge a reaction stream comprising the second product ~512

FIG. 5

SYSTEM AND METHOD FOR SEPARATING A REACTION PRODUCT FROM A FLUID

TECHNICAL FIELD

This disclosure relates generally to systems and methods for removing a reaction product from a fluid in a redox flow electrochemical separation device.

BACKGROUND

Condensation reactions are reactions in which two molecules, or two parts of the same molecule, combine to form a larger molecule with the elimination of a smaller molecule. Similarly, polycondensation reactions involve the covalent connection of monomer molecules, leading to high molecular weight polymers with the release of multiple small molecules. Examples of condensation and polycondensation reactions include industrially significant processes such as polyester synthesis (via polycondensation) and biodiesel production (via esterification or transesterification).

The reactions are in equilibrium with the formation of the larger molecule product and the smaller molecule product; therefore, to drive the reaction to completion and collect the desired product (e.g., the larger molecule), the smaller molecule is separated from the reaction fluid. As current techniques for removing the smaller molecule product involve thermal energy, expensive procedures, and/or wasteful amounts of reactant materials, described herein are systems and methods for in-situ separation of the smaller molecule product using a redox flow electrochemical separation device.

SUMMARY

Embodiments described herein are directed to an electrochemical system for separating a reaction product from a first fluid stream. The system includes a first reservoir that comprises the first fluid stream input to the first reservoir and a catalyst input to the first reservoir, wherein the first fluid stream comprises a reaction mixture that reacts to form a first product and a second product in the first reservoir. A second reservoir comprises a second fluid stream input to the second reservoir. A first electrode contacts a first solution of a first redox-active electrolyte material and is configured to have a reversible redox reaction with the first redox-active electrolyte material, and to accept at least one ion from the catalyst in the first reservoir. A second electrode contacts a second solution of a second redox-active electrolyte material and is configured to have a reversible redox reaction with the second redox-active electrolyte material, and to drive at least one ion into the second fluid in the second reservoir. The system also includes an energy source configured to supply electrical potential to the first and second electrodes. A first type of inert ion exchange membrane is disposed between the first and second reservoirs, and a second type of inert ion exchange membrane, different from the first type, is disposed between the first electrode and the first reservoir and is disposed between the second electrode and the second reservoir. A waste effluent stream comprising the second product and the catalyst is output from the second reservoir, wherein the second product is removed from the first reservoir via electroosmosis, and a product effluent stream comprising the first product is output from the first reservoir.

Other embodiments are directed to a method for separating a reaction product from a first fluid steam. The method includes inputting a first fluid stream comprising a reaction mixture to a first reservoir defined by a first ion exchange membrane and a second ion exchange membrane of an electrochemical cell, wherein the second ion exchange membrane is a different type of membrane from the first ion exchange membrane. A catalyst is also input to the first reservoir. A second fluid stream is input to a second reservoir of the electrochemical cell, wherein the second reservoir is defined by the first ion exchange membrane and a third ion exchange membrane, wherein the third ion exchange membrane and the second ion exchange membrane are of the same type. A first component and a second component of the reaction mixture undergo a condensation reaction in the first reservoir to form a first product and a second product. An external voltage is applied to first and second electrodes of the electrochemical cell, and a solution comprising a redox-active electrolyte material is circulated between the first and second electrodes. The redox-active electrolyte material reduces when in contact with the first electrode and oxidizes when in contact with the second electrode. In response to the reduction and oxidation of the redox-active electrolyte material, ions are transported across each of the ion exchange membranes to remove the catalyst and the second product from the first reservoir. A waste effluent stream comprising the second product and the catalyst is outputted from the second reservoir, and a product effluent stream comprising the first product is output from the first reservoir.

Further embodiments are directed to a method for separating a reaction product from a first fluid steam. The method includes inputting a first fluid stream comprising a reaction mixture to a first channel of a forward osmosis membrane contactor and inputting a catalyst to the first channel. A draw solution comprising a concentrated solution of ionic species is input to a second channel of the forward osmosis membrane contactor, wherein the second channel is separated from the first channel by a forward osmosis membrane. The first component and the second component of the reaction mixture react in a condensation reaction in the first channel to form a first product and a second product. In response to formation of the second product, the second product is transported across the forward osmosis membrane to remove the second product from the first channel. A draw solution effluent stream comprising the draw solution and the second product is output from the second channel, and a product effluent stream comprising the first product and the catalyst is output from the first channel.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

FIGS. 4-5 are flow diagrams of methods in accordance with certain embodiments.

DETAILED DESCRIPTION

Figure 1:
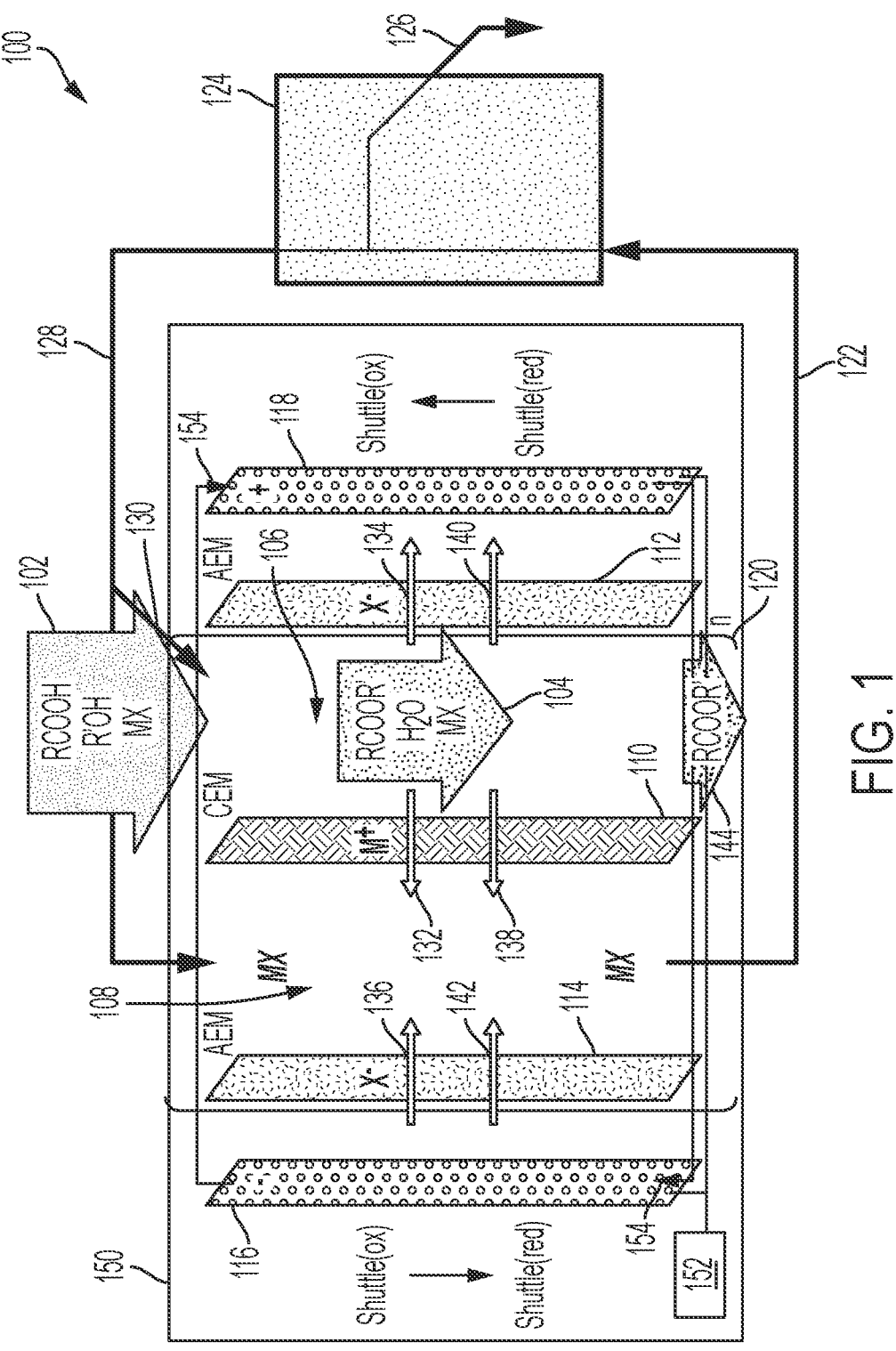
FIG. 1 is a schematic diagram of fluid flow in a redox flow electrochemical separation system in accordance with certain embodiments.

The present disclosure relates to redox flow electrochemical salt separation systems. In certain embodiments, a redox flow electrochemical separation system may be part of a dehumidification system as a liquid desiccant system used in, among other things, heating, ventilation, and air-conditioning (HVAC). A redox-assisted dehumidification system utilizes a liquid desiccant (commonly an aqueous solution of an inorganic salt such as lithium chloride) that is fed through an air contactor where it absorbs humidity from input humid air and becomes diluted, or weakened. The weak desiccant is then fed into an electrochemical regenerator (e.g., cell or stack) that uses a redox shuttle to move salt from one liquid stream to another. In other embodiments, redox flow electrochemical separation systems may be used in dewatering applications.

As set forth above, condensation and polycondensation reactions (hereinafter referred to collectively as "condensation reactions") produce a larger molecule first product and a smaller molecule second product. The smaller molecule second product may be water or a low carbon number alcohol such as methanol. Systems and methods described herein remove the smaller molecule second product, such as water, that is produced in a condensation or polycondensation reaction, in-situ, thereby driving the reaction forward to completion. This allows for continuous removal of the smaller molecule second product from a reaction mixture without any heat or phase changes. The avoidance of heat and/or phase changes is useful when a reactant or solvent in the reaction mixture is volatile, e.g., more volatile than water and because it can lower the rate of the reverse (unwanted, e.g., hydrolysis) reaction of the larger molecule first product with the smaller molecule second product.

The smaller molecule produced by a condensation reaction can limit, or determine, how the reaction is driven to completion to obtain the desired product (e.g., the larger molecule). Typical condensation reactions involve an organic acid reacting with an alcohol to form an ester and a molecule of water, or in other typical condensation reactions, an organic acid reacts with an amine to form an amide and a molecule of water. To drive the reactions to completion, the smaller molecule second product (e.g., water) is removed to perturb the equilibrium state of the reaction. When the eliminated smaller molecule second product is more volatile than either of the reactants, heat can be supplied to boil off, in certain circumstances continuously, the volatile elimination product. While this may work when the smaller molecule second product is volatile, using thermal energy is not an option when one of the reactants is more volatile than the smaller molecule second product such as an alcohol (e.g., in the case of ethanol reacting with acetic acid to form ethyl acetate and water) or an amine such as methylamine.

When thermal energy is not advisable or available due to the volatility of the reactants, other techniques are used to drive the condensation reaction to completion. For example, a large excess of one of the reactants can be used to drive the reaction. However, this is wasteful, can be expensive, and the volatile reactant still needs to be condensed, recovered, and re-separated from water, or the smaller molecule second product. A catalyst with a high affinity for water, or the smaller molecule, such as concentrated sulfuric acid may be added to the reaction mixture to drive the reaction, but sulfuric acid is corrosive and must be neutralized after the reaction is complete. Another technique is to mix in a water-absorbing material such as a zeolite or molecular sieve, but the absorbent material is usually a solid and has limited chemical compatibility, especially with acidic catalysts. Pre-activating one of the reactants, e.g., by converting carboxylic acid to an acyl chloride, can drive the reaction. However, this requires stoichiometric amounts of reagent and is expensive. Further, fractional distillation of the recovered water and volatile reactant can be used and the reconcentrated reactant can be returned to the reaction mixture. Each of these techniques is costly (e.g., in time, money, and/or energy), and in certain circumstances, can lower the reaction rate. Instead, the in-situ techniques, and systems therefor, described herein utilize a redox shuttle to drive ion motion to remove the smaller molecule second product from a condensation reaction mixture.

The in-situ removal of the smaller molecules, e.g., water, formed through a condensation reaction, occurs when a reaction mixture is fed into a device containing multiple ion exchange membranes in an electrochemical cell. The electrochemical cell utilizes a solution phase redox shuttle circulating between two electrodes, between which lie the ion exchange membranes—alternating cation exchange membranes and anion exchange membranes. When an electrical potential is applied between the two electrodes, the redox shuttle is simultaneously reduced at one electrode and re-oxidized at the opposite electrode. Between the two electrodes, cations and anions are transported selectively through the intervening ion exchange membranes, such that ions present in the reaction mixture are removed to a waste stream. The removed ions may come from a catalyst, an added supporting electrolyte, or both. In addition, the smaller molecule (e.g., water) is removed from the reaction stream through electroosmosis. When the waste stream has a higher affinity for the smaller molecule than the reaction mixture, the smaller molecule may also move to the waste stream due to forward osmosis. This device is further described below.

FIG. 1 is a diagram of an electrochemical system 100 illustrating fluid and ion movement in accordance with various embodiments. An electrochemical device 150 includes two electrodes 116, 118, at least three ion exchange membranes 110, 112, 114, an energy supply 152, a reaction mixture, and a receiving fluid. Each electrode 116, 118 is in contact with a redox shuttle solution comprising a redox-active electrolyte material. Examples of redox shuttle solution include 1,1'-bis((3-trimethylammonio)propyl)ferrocene ($[BTMAP-Fc]^{2+}$) and 1,1'-bis((3-trimethylammonio)propyl) ferrocenium ($[BTMAP-Fc]^{3+}$), or 1,1'-bis((3-dimethylethyl-ammonio)propyl)ferrocene ($[BDMEAP-Fc]^{2+}$) and 1,1'-bis((3-dimethylethylammonio)propyl)ferrocenium ($[BDMEAP-Fc]^{3+}$), which are non-toxic, highly stable, have very rapid electrochemical kinetics and negligible membrane permeability, or ferrocyanide/ferricyanide ($[Fe(CN)_6]^{4-}/[Fe(CN)_6]^{3-}$). Additional details for example redox shuttle solutions can be found in commonly-owned U.S. patent application Ser. No. 17/390,600, which is hereby incorporated by reference in its entirety.

The redox shuttle is circulated between the two electrodes 116, 118 as shown by loop 154. When an electrical potential is applied to each electrode 116, 118 by energy supply 152, the redox shuttle is reduced at a first electrode (e.g., 116) and oxidized at the opposite electrode (e.g., 118). The energy supply 152 may be any variety of direct current (DC) energy supply such as a battery, photovoltaic panel, galvanic cell, potentiostat, AC/DC power converter, etc., the polarity may be kept the same throughout or periodically reversed, and the energy supply may be contained within the electrochemical device 150 or be external and coupled to the device 150. Thus, as the shuttle circulates between the electrodes, the portions of the shuttle are continuously alternating between the redox states. In certain embodiments, each electrode 116, 118 may contact separate redox-active solutions instead of the same redox shuttle solution being flowed in a loop. The separate redox-active solutions may have the same redox-active electrolyte material or different redox-active electrolyte materials. When different redox-active solutions are used for the respective electrodes 116, 118, the energy supply periodically reverses the potential supplied to the electrodes to restore the state of charge (i.e., the proportion of redox-active electrolyte material in each solution that is in the oxidized state compared to the reduced state) of each of the redox-active electrolyte material solutions.

Positioned between the electrodes 116, 118 are three, or more, ion exchange membranes, which alternate in the type of ion exchanged. For example, among three membranes, a center membrane 110 may be a cation exchange membrane flanked by second 112 and third 114 anion exchange membranes, as is shown in FIG. 1. However, in other embodiments, the center, first membrane may be an anion exchange membrane and the second and third membranes may be cation exchange membranes. The membranes 110, 112, 114 define channels, or reservoirs, in the electrochemical device 150. As may be seen, a first membrane 110 and a second membrane 112 define a first reservoir 106. The first membrane 110, in combination with a third membrane 114, also defines a second reservoir 108. The membranes are ion-selective as well as water-permeable, are insoluble in organic solvents, and are inert (i.e., do not chemically change) in the reaction mixture and/or products. In certain embodiments, the membranes are as thin as possible (e.g., 10-50 μm) to maximize the rate of forward osmosis water transport through the membranes. In certain embodiments, the membranes are reinforced with a polymer mesh integrated into the membrane itself and in other embodiments, the membranes are not reinforced.

Within the first reservoir 106 is a reaction mixture 104. The reaction mixture may be fed into the first reservoir 106 as a feed stream. The reaction mixture comprises at least two components (e.g., an organic acid and an alcohol) that undergo a condensation reaction to form a first, larger molecule product, and a second, smaller molecule product. The reaction mixture may also include a catalyst (e.g., sulfuric acid, or Lewis acidic salt such as scandium triflouromethanesulfonate, or indium (III) chloride) and/or a supporting electrolyte. The catalyst and/or supporting electrolyte may be present in the reaction mixture 102 before the reaction mixture enters the electrochemical device 150, or it may be added to the first reservoir to mix with the reaction mixture 104. In the first reservoir 106, the first and second components (e.g., reagents) of the reaction mixture undergo a condensation reaction to form the first and second products in the first reservoir 106. As discussed above, to collect or obtain the desired product (e.g., the first, larger molecule product), other components are removed from the first reservoir 106. When an electrical potential is applied to the electrodes 116, 118, the oxidation and reduction of the shuttle solution drives ions across the membranes 110, 112, 114. As shown, ions of the catalyst and/or supporting electrolyte material (e.g., $M^+$, $X^-$), are transported 132, 134 across the respective cation and anion exchange membranes 110, 112 defining the first reservoir 106 toward the oppositely charged electrodes 116, 118.

The same ion transport occurs for catalyst and/or supporting electrolyte material ions 136 throughout the electrochemical device 150. Thus, the catalyst is removed from the first reservoir 106 and concentrated in the second reservoir 108 where the ions reform the catalyst in a fluid operating as a waste fluid stream. The fluid in the second reservoir may comprise water, methanol, acetonitrile, brines, process wastewater from a different system, etc. The fluid in the second reservoir may further comprise one or more dissolved solutes such as buffers, sugars, amino acids, salts, more or a different type of catalyst, glycerol, ethylene glycol, etc. The movement of the ions 132, 134, 136 across the ion exchange membranes 110, 112, 114, also drags 138, 140, 142 the smaller molecules of the second product of the condensation reaction across the membranes due to electroosmosis. In certain embodiments where the fluid in the second reservoir 108 has a higher affinity for the smaller molecules than the reaction mixture, the smaller molecules may also move to the second reservoir 108 due to forward osmosis. Thus, both the catalyst and the second product are removed from the first reservoir 106 leaving a concentrated product stream 144 that may be collected, or further processed, upon output from the electrochemical device 150. The concentrated product stream may also still contain residual amounts (i.e., lower than the starting reaction mixture 102) of the reactants, second product, and catalyst.

As indicated by brackets 120, the two membranes 110, 114 and the corresponding first and second reservoirs 106, 108, can be considered a single cell pair that repeats within the electrochemical device 150. For example, a plurality of these cell pairs may result in a stack of up to 10, up to 20, up to 50, up to 100, up to 200, up to 500, or more, membranes, alternating in ion exchange type, between the electrodes 116, 118, where the total number of membranes is an odd number. A final membrane (e.g., 112) couples to the stack to define the $n^{th}$ first reservoir. Increasing the number of cell pairs in the electrochemical device 150 increases the overall membrane area in the device and allows for smaller footprints overall to be achieved. In addition, the rate of water removal would be further enhanced if the second reservoirs 108 contain fluid that has a higher affinity for the small molecules than the affinity of the shuttle solution for the small molecules because the $1^{st}$ to the $(n-1)^{th}$ first reservoirs 106 will be in contact with two kinds of second reservoir 108, rather than one kind of second reservoir 108 and a shuttle solution. When a plurality of cell pairs is combined into a stack the condensed product effluent streams 144 are combined into an output and the waste effluent streams of the respective second reservoirs 122 are combined and output from the electrochemical device 150.

While the fluid in the second reservoir takes up catalyst, it also takes up the second product. When the second product is water, or an alcohol, the fluid in the second reservoir may be diluted depending on the amount of second product taken up with respect to the amount of catalyst, or other ions, taken up. Using just the catalyst and second product as an example, if the fluid in the second reservoir takes up more of the second product than catalyst compared to the starting second product:catalyst ratio, the fluid in the second reservoir will be diluted with respect to the initial second fluid composition. If the fluid in the second reservoir takes up more catalyst than second product compared to the starting second product:catalyst ratio, the fluid in the second reservoir will be more concentrated in catalyst than the initial second fluid composition. Further, if the fluid in the second reservoir takes up a proportional amount of both catalyst and second product compared to the starting second product: catalyst ratio, the composition of the waste effluent stream 122 may be substantially equal to that of the initial second fluid.

The waste effluent stream from the second reservoir 122 is circulated to a regeneration system 124 to remove the unwanted smaller molecule second product as a discharge stream 126 and concentrate the fluid supplied to the second reservoir 108 as output stream 128. A portion 130 of the output stream 128 may also be diverted to the first reservoir 106 to supply catalyst to the reaction mixture 102. The regeneration system 124 may be a conventional regenerator (e.g., thermal regeneration, electrodialysis, reverse osmosis, forward osmosis, membrane pervaporation, falling-film evaporation, etc.) or a redox-assisted regenerator.

A redox-assisted regenerator has a similar configuration to the electrochemical device 150. When the regeneration system 124 utilizes a redox-assisted regenerator, the regenerator has two outer ion exchange membranes separating outer redox shuttle channels proximate respective electrodes from an inner concentrate stream and an inner dilute stream (e.g., waste effluent stream 122 from the second reservoir 108). The outer ion exchange membranes are of a first type of ion exchange membrane (e.g., anion exchange membranes (AEM)), and the concentrate and dilute streams are separated by a central ion exchange membrane of an opposing ion exchange type (e.g., cation exchange membrane (CEM)). In other configurations, the central ion exchange membrane may be an AEM and the outer membranes may be CEMs.

When an external voltage induces oxidation or reduction in the redox-active shuttle molecules (see redox shuttle solution examples above) at the respective electrodes, ions (e.g., of a liquid desiccant, a draw solution, or the ionic catalyst) from the waste effluent stream 122 are driven across the membranes without splitting water or producing other gaseous by products (e.g. chlorine, oxygen, hydrogen). The ion movement creates two streams: re-concentrated catalyst stream 128 (formerly the waste effluent stream 122) and a discharge stream 126 of the second product (e.g., water). The regeneration can also be achieved over multiple stages or with a membrane stack similar to the stack described above. Moving parts of the system may include low pressure pumps for liquid circulation and fans for air circulation. The regeneration system 124 may share power supply 152 or have a dedicated power supply. Additional details of this type of four-channel, electrodialytic, stack with redox shuttle assist can be found in commonly-owned U.S. Pat. No. 10,821,395, which is hereby incorporated by reference in its entirety.

Figures 2, 3A, 3B:
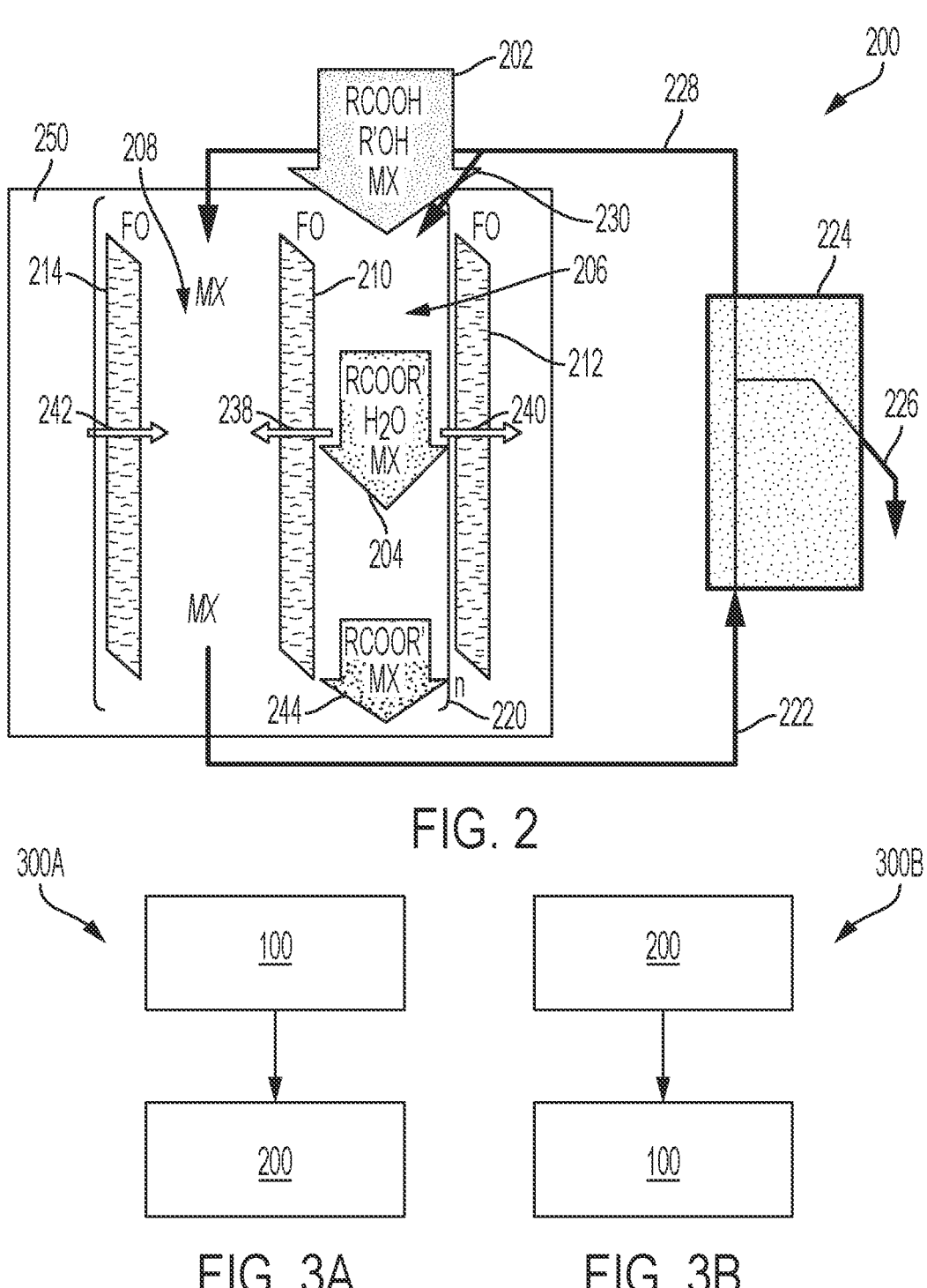
FIG. 2 is a schematic diagram of fluid flow in a forward osmosis membrane contactor in accordance with certain embodiments.
FIG. 3A is a block diagram of a relationship between the separation system of FIG. 1 and the forward osmosis membrane contactor of FIG. 2 in accordance with certain embodiments.
FIG. 3B is a block diagram of a relationship between the separation system of FIG. 1 and the forward osmosis membrane contactor of FIG. 2 in accordance with certain embodiments.

In other embodiments, an alternative separation system 200 is configured to remove the smaller molecule, second product from the reaction mixture. FIG. 2 illustrates fluid flow in a forward osmosis membrane contactor 250. A forward osmosis membrane contactor 250 includes at least one forward osmosis membrane. When a contactor 250 comprises a single forward osmosis membrane, the membrane divides the contactor 250 into to two channels, or reservoirs, where a first reservoir contains a reaction mixture and the second reservoir contains a draw solution of a concentrated ionic species. While a forward osmosis membrane contactor 250 may contain a single forward osmosis membrane, it may also include a plurality of two or more forward osmosis membranes. The example shown in FIG. 2 includes three forward osmosis membranes, 210, 212, 214, and the following description of a three-membrane forward osmosis contactor 250 similarly applies to a contactor 250 comprising one, two, or more than three membranes as well.

The forward osmosis membranes 210, 212, 214 are selected to have high permeability for the smaller molecule, second product of the condensation reaction (e.g., water). In the three-membrane configuration shown, the first membrane 210 and a second membrane 212 define a first channel, or reservoir, 206, and the first membrane 210 and a third membrane 214 define a second channel, or reservoir 208. Each of the membranes 210, 212, 214 may be the same or they may differ in materials, size, shape, etc.

Within the first reservoir 206 is a reaction mixture 204. The reaction mixture may be fed into the first reservoir 206 as a feed stream 202. The reaction mixture comprises at least two components (e.g., an organic acid and an alcohol) that undergo a condensation reaction to form a first, larger molecule product, and a second, smaller molecule product. The reaction mixture may also include a catalyst (e.g., sulfuric acid, scandium trifluoromethanesulfonate, indium (III) chloride, etc.) and/or a supporting electrolyte. The catalyst and/or supporting electrolyte may be present in the reaction mixture 202 before the reaction mixture enters the forward osmosis contactor 250, or it may be added to the first reservoir 206 to mix with the reaction mixture 204. In the first reservoir 206, the first and second components (e.g., reagents) of the reaction mixture undergo a condensation reaction to form the first and second products in the first reservoir 206. As discussed above, to collect or obtain the desired product (e.g., the first, larger molecule product), the second product is removed from the first reservoir 206.

Within the second reservoir 208 is a draw solution of a concentrated ionic species. The dissolved species in the draw solution can be identical to a supporting electrolyte in the reaction mixture (e.g., sodium chloride) or identical to the catalyst (e.g., sulfuric acid, scandium trifluoromethanesulfonate, indium(III) chloride, etc.), or include both. The smaller molecule, second product is moved 238, 242 to the draw solution in the second reservoir 208, or out 240 of the first reservoir 206, by forward osmosis. The dehydrated, or concentrated reaction stream in the first reservoir, where the condensation reaction has been driven to, at least substantial, completion, is output as an effluent stream 244 comprising the first product, the catalyst, and possibly residual traces of the second product. In certain embodiments, the first reaction product may be further separated from the catalyst using a redox-assisted regenerator as discussed above in connection with regeneration system 124, or a conventional separation process such as filtration, distillation, crystallization, precipitation, chromatography, electrodialysis, etc.

As discussed above and indicated by brackets 220, the forward osmosis membrane contactor 250 may include a plurality (n) of forward osmosis membranes in addition to forward osmosis membrane 212. As shown by the location of the brackets 220, in total, there are 2n+1 forward osmosis membranes disposed in a container that divide the container into 2n+2 channels, or reservoirs. When n=0, a single membrane defines two channels as discussed above. The channels are configured to accept and flow reactant streams and draw solution streams in an alternating configuration thereby outputting dehydrated (e.g., concentrated) reaction streams 244 and effluent streams 222. The total forward osmosis membranes may form a stack of up to 10, up to 20, up to 50, up to 100, up to 200, up to 500, or more, membranes. The membrane e.g., 212 couples to the stack to define the n$^{th}$ first reservoir. Increasing the number of cells in the forward osmosis membrane contactor 250 increases the overall membrane area in the device and allows for smaller device footprints overall to be achieved. When a plurality of membranes is combined into a stack to define a plurality of first and second channels, the condensed first product effluent streams 244 are combined into an output and the effluent streams of the respective second reservoirs 222 are combined and output from the forward osmosis membrane contactor 250.

Due to the influx transport of the second product into the second reservoir(s) 208, the fluid in the second reservoir(s) 208 is diluted. The diluted effluent stream from the second reservoir 222 is circulated to a regeneration system 224 to remove the unwanted smaller molecule second product as a discharge stream 226 and reconcentrate the fluid supplied to the second reservoir 208 as output stream 228. A portion 230 of the output stream 228 may also be diverted to the first reservoir 206 to supply catalyst to the reaction mixture 202. As discussed above, the regeneration system 224 may be a conventional regenerator (e.g., thermal regeneration, electrodialysis, reverse osmosis, forward osmosis, membrane pervaporation, falling-film evaporation, etc.) or a redox-assisted regenerator.

In certain embodiments as shown in FIG. 3A, the separation system 200 is coupled to the output of the electrochemical system 100 to form a removal system 300A for the smaller molecule, second product of a condensation reaction. Thus, the output 144 would be the input 244 to the forward osmosis membrane contactor 250. While the separation system 100 removes most of the second product from the reaction mixture, any remainder may be removed by forward osmosis in the forward osmosis membrane contactor-based separation system 200. The overall system 300A utilizes a redox shuttle to drive water, or other small molecules, from a reaction mixture without thermal energy.

In certain other embodiments as shown in FIG. 3B, the separation system 200 is coupled to the input of the electrochemical system 100 to form a removal system 300B for the smaller molecule, second product of a condensation reaction. Thus, the output 244 would be the input 144 to the electrochemical device 150. While the separation system 200 removes most of the second product from the reaction mixture, any remainder may be removed by electroosmosis with the catalyst in the electrochemical system 100. The overall system 100, 300A, and/or 300B utilizes a redox shuttle to drive water, or other small molecules, from a reaction mixture without thermal energy. Thus, the respective systems may be used with condensation reactions with volatile reactants but without costly redistillation of those reactants from the liberated second product (e.g., water). The system 300A, 300B, electrochemical system 100 alone, or forward osmosis-based separation system 200 alone also avoid the need to use excess stoichiometric amounts of volatile reactants which can be costly and lower the reaction rate.

A separation process for removing the smaller molecule product from a condensation reaction mixture is further illustrated in FIG. 4. A reaction mixture is input to a first reservoir of an electrochemical cell, such as described above in connection with FIG. 1, where a first and second component of the reaction mixture undergo a reaction to form a first, larger molecule product and a second, smaller molecule product 402. In certain embodiments, the first and second components are an organic acid and an alcohol, which undergo a condensation reaction. In other embodiments, the first and second components are an organic amine and an organic acid, which undergo a condensation reaction. Another fluid stream is input to an adjacent, second reservoir of the electrochemical cell 404. When an external voltage is applied to first and second electrodes of the electrochemical cell and a redox shuttle is circulated between the electrodes, it drives ion movement in the electrochemical cell across membranes toward oppositely charged electrodes 406. Specifically, ions of a catalyst in the reaction mixture are driven out of the first reservoir, taking the smaller molecules of the second product with them due to electroosmosis 408. A waste effluent stream comprising the second product and the catalyst is output from the second reservoir 410, and a product effluent stream comprising the first product is output from the first reservoir 412. Although the first and second products are separated, they may each be further processed, or if undesired (e.g., the second product), discarded as waste.

Another separation process for removing the smaller molecule product from a condensation reaction mixture is illustrated in FIG. 5. A reaction mixture is input to a first channel of a forward osmosis membrane contractor, such as described above in connection with FIG. 2, where a first and second component of the reaction mixture undergo a reaction to form a first, larger molecule product and a second, smaller molecule product 502. In certain embodiments, the first and second components are an organic acid and an alcohol, which undergo a condensation reaction. In other embodiments, the first and second components are an organic amine and an organic acid, which undergo a condensation reaction. A draw solution stream is input to an adjacent, second channel of the forward osmosis membrane contactor 504. Because the draw solution has a salt concentration with a high affinity for the smaller molecule second product, the second product is transported across the forward osmosis membranes and out of the first channel to the second channel via forward osmosis 506. A waste effluent stream comprising the second product is output from the second channel 508, and a product effluent stream comprising the first product is output from the first channel 510. The waste effluent stream is optionally regenerated, as described above, and recirculated to be input to the second channel 512. Although the first and second products are separated, they may each be further processed, or if undesired (e.g., the second product), discarded as waste.

As set forth above, various embodiments directed to separating a smaller molecule product (e.g., water) of a condensation reaction from a reaction mixture may utilize a redox-assisted shuttle separation system and/or a forward osmosis membrane contactor to drive the reaction to completion and recover a desired reaction product. An electrochemical cell contains a solution phase stream of a redox shuttle that is circulated from one electrode to the other and back again. Between the electrodes lies a series of substantially parallel, alternating cation and anion exchange membranes. A first stream of fluid comprising a reaction mixture present in a first reservoir of the electrochemical cell does not mix with a second fluid stream in an adjacent reservoir of the electrochemical cell but the two fluid streams contact each other through opposite sides of a membrane separating the two channels. Application of an external voltage to the electrodes of the cell initiates selective transport of ionic species and small molecules (i.e., a second product of the reaction mixture) from the first fluid stream to the second fluid stream across the membrane. The ionic transport in the electrochemical cell and/or the forward osmosis of the contactor separates a first reaction product from a second reaction product without the use of thermal energy or costly materials and/or processes.

In all embodiments described above, the small molecule second product is directly (through forward osmosis), or indirectly (through electroosmosis), transported from one fluid stream to another at some point in the system or process. This should be understood to also encompass other molecules identical to the small molecule second product that were in the reaction mixture before the second product is introduced to the system or process. For example, a reaction mixture of organic acid and alcohol may also include water at the beginning together with a sulfuric acid catalyst, and further molecules of water are created during the reaction between the organic acid and alcohol to form an ester. The systems and processes described above are intended to remove not just the water that is created in the reaction, but also water that was present at the beginning, if so desired.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. An electrochemical system for separating a reaction product from a first fluid stream, comprising:

a first reservoir comprising a first fluid stream input to the first reservoir and a catalyst input to the first reservoir, wherein the first fluid stream comprises a reaction mixture that reacts to form a first product and a second product in the first reservoir;

a second reservoir comprising a second fluid stream input to the second reservoir;

a first electrode contacting a first solution of a first redox-active electrolyte material and configured to have a reversible redox reaction with the first redox-active electrolyte material, and accept at least one ion from catalyst in the first reservoir;

a second electrode contacting a second solution of a second redox-active electrolyte material and configured to have a reversible redox reaction with the second redox-active electrolyte material, and drive at least one ion into the second fluid in the second reservoir;

an energy source configured to supply electrical potential to the first and second electrodes;

a first type of inert ion exchange membrane disposed between the first and second reservoirs;

a second type of inert ion exchange membrane, different from the first type, disposed between the first electrode and the first reservoir and disposed between the second electrode and the second reservoir;

a waste effluent stream comprising the second product and catalyst output from the second reservoir, wherein the second product is removed from the first reservoir via electroosmosis; and a product effluent stream comprising the first product output from the first reservoir.

2. The system of claim 1, wherein the reaction mixture comprises a first component and a second component which undergo a condensation reaction in the first reservoir.

3. The system of claim 2, wherein the condensation reaction moves to completion as the second product is removed from the first reservoir.

4. The system of claim 1, wherein the second product is water.

5. The system of claim 1, wherein the first solution and the second solution are the same and the first and second solutions are circulated between the first electrode and the second electrode when an electrical potential is applied to the electrodes.

6. The system of claim 1, wherein the first reservoir, the second reservoir, a membrane of the first type, and a membrane of the second type form a cell, and the system comprises a plurality of cells coupled together between the first and second electrodes.

7. The system of claim 1, further comprising a liquid concentrator coupled to the waste effluent stream and configured to generate a concentrated second fluid stream and a reaction waste stream comprising the second product.

8. The system of claim 7, wherein the concentrated second fluid stream is fed to the second reservoir as the second fluid stream.

9. The system of claim 7, wherein a portion of the concentrated second fluid stream is fed to the first reservoir to input the catalyst.

10. The system of claim 7, wherein the liquid concentrator is an electrochemical liquid desiccant regenerator utilizing a redox shuttle.

11. The system of claim 1, wherein the second product is concurrently removed from the first reservoir via osmosis.

12. The system of claim 1, further comprising:

a forward osmosis membrane contactor comprising:

at least one forward osmosis membrane;

a first channel comprising the first fluid stream and the catalyst input to the first channel, wherein the reaction mixture and catalyst react to form the first product and the second product in the first channel;

a second channel separated from the first channel by the at least one forward osmosis membrane and comprising a draw solution comprising a concentrated solution of ionic species;

a draw solution effluent stream comprising the draw solution and the second product output from the second channel, wherein the second product is removed from the first channel through osmosis; and an intermediate product effluent stream comprising the first product and the catalyst output from the second channel, wherein the intermediate product effluent stream is the first fluid stream input to the first reservoir.

13. The system of claim 12, wherein the forward osmosis membrane contactor comprises a plurality of forward osmosis membranes.

14. The system of claim 12, further comprising a liquid concentrator coupled to the draw solution effluent stream and configured to generate a concentrated draw solution stream and a second waste stream comprising the second product.

15. The system of claim 1, further comprising:
a forward osmosis membrane contactor comprising:
at least one forward osmosis membrane;
a first channel comprising the product effluent stream input to the first channel;
a second channel separated from the first channel by the at least one forward osmosis membrane and comprising a draw solution comprising a concentrated solution of ionic species;
a draw solution effluent stream comprising the draw solution and the second product output from the second channel, wherein the second product is removed from the first channel through osmosis; and
a final product effluent stream comprising the first product output from the first channel.

16. A method for separating a reaction product from a first fluid steam, comprising:
inputting a first fluid stream comprising a reaction mixture to a first reservoir defined by a first ion exchange membrane and a second ion exchange membrane of an electrochemical cell, wherein the second ion exchange membrane is a different type of membrane from the first ion exchange membrane;
inputting a catalyst to the first reservoir;
inputting a second fluid stream to a second reservoir of the electrochemical cell, wherein the second reservoir is defined by the first ion exchange membrane and a third ion exchange membrane, wherein the third ion exchange membrane and the second ion exchange membrane are of the same type;
a first component and a second component of the reaction mixture undergoing a condensation reaction in the first reservoir to form a first product and a second product;
applying an external voltage to first and second electrodes of the electrochemical cell;
circulating a solution comprising a redox-active electrolyte material between the first and second electrodes, wherein the redox-active electrolyte material reduces when in contact with the first electrode and oxidizes when in contact with the second electrode;
in response to a reduction and oxidation of the redox-active electrolyte material, transporting ions across each of the ion exchange membranes to remove the catalyst and the second product from the first reservoir;
outputting a waste effluent stream comprising the second product and the catalyst from the second reservoir; and
outputting a product effluent stream comprising the first product output from the first reservoir.

17. The method of claim 16, wherein transporting ions of the second product across the ion exchange membranes drives the condensation reaction to completion.

18. The method of claim 16, further comprising:
outputting the waste effluent stream to a liquid concentrator;
generating a concentrated second fluid stream comprising the catalyst and a reaction waste stream comprising the second product;
outputting the reaction waste stream for disposal; and
circulating the concentrated second fluid stream to the second reservoir as the second fluid stream.

19. The method of claim 16, further comprising:
inputting a third fluid stream comprising the reaction mixture to a first channel of a forward osmosis membrane contactor;
inputting a catalyst to the first channel;
inputting a draw solution comprising a concentrated solution of ionic species to a second channel of the forward osmosis membrane contactor, wherein the second channel is separated from the first channel by a forward osmosis membrane;
the first component and the second component of the reaction mixture undergoing a condensation reaction in the first channel to form the first product and the second product;
in response to formation of the second product, transporting the second product across the forward osmosis membrane to remove the second product from the first channel;
outputting a draw solution effluent stream comprising the draw solution and the second product from the second channel;
outputting an intermediate product effluent stream comprising the first product and the catalyst from the first channel; and
inputting the intermediate product effluent stream to the first reservoir of the electrochemical cell as the first fluid stream.

20. A method for separating a reaction product from a first fluid steam, comprising:
inputting a first fluid stream comprising a reaction mixture to a first channel of a forward osmosis membrane contactor;
inputting a catalyst to the first channel;
inputting a draw solution comprising a concentrated solution of ionic species to a second channel of the forward osmosis membrane contactor, wherein the second channel is separated from the first channel by a forward osmosis membrane;
reacting a first component and a second component of the reaction mixture in a condensation reaction in the first channel to form a first product and a second product;
in response to formation of the second product, transporting the second product across the forward osmosis membrane to remove the second product from the first channel;
outputting a draw solution effluent stream comprising the draw solution and the second product from the second channel;
outputting a product effluent stream comprising the first product and the catalyst from the first channel.

21. The method of claim 20, further comprising:
outputting the draw solution effluent stream to a liquid concentrator;
generating a concentrated second fluid stream comprising the catalyst and ionic species and generating a reaction waste stream comprising the second product;
outputting the reaction waste stream for disposal; and
circulating the concentrated second fluid stream to the second channel as the draw solution.

22. The method of claim 21, further comprising:
circulating a portion of the concentrated second fluid stream to a first reservoir.

* * * * *